United States Patent
Robertson et al.

(10) Patent No.: US 10,623,743 B1
(45) Date of Patent: Apr. 14, 2020

(54) COMPRESSION OF CAPTURED IMAGES INCLUDING LIGHT CAPTURED FROM LOCATIONS ON A DEVICE OR OBJECT

(71) Applicant: Facebook Technologies, LLC, Menlo Park, CA (US)

(72) Inventors: John Enders Robertson, Palo Alto, CA (US); Maksym Katsev, Los Altos, CA (US); Neil Konzen, Hunts Point, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/986,497

(22) Filed: May 22, 2018

(51) Int. Cl.
| | |
|---|---|
| H04N 5/225 | (2006.01) |
| H04N 19/136 | (2014.01) |
| H04N 19/82 | (2014.01) |
| H04N 19/172 | (2014.01) |
| H04N 5/235 | (2006.01) |
| H04N 19/105 | (2014.01) |
| H04N 19/182 | (2014.01) |

(52) U.S. Cl.
CPC ......... *H04N 19/136* (2014.11); *H04N 5/2351* (2013.01); *H04N 19/105* (2014.11); *H04N 19/172* (2014.11); *H04N 19/182* (2014.11); *H04N 19/82* (2014.11)

(58) Field of Classification Search
CPC ............................................... H04N 19/00–90
USPC ............................................ 348/43, 61, 169
See application file for complete search history.

(56) References Cited

U.S. PATENT DOCUMENTS

| | | | |
|---|---|---|---|
| 10,515,583 B2* | 12/2019 | Hwang | G09G 3/3208 |
| 2007/0223823 A1* | 9/2007 | Islam | H04N 19/132 |
| | | | 382/232 |
| 2009/0167682 A1* | 7/2009 | Yamashita | G01C 21/36 |
| | | | 345/158 |
| 2011/0080490 A1* | 4/2011 | Clarkson | G06F 3/017 |
| | | | 348/222.1 |
| 2012/0262558 A1* | 10/2012 | Boger | G02B 27/0093 |
| | | | 348/61 |
| 2015/0193983 A1* | 7/2015 | Katz | G02B 27/017 |
| | | | 345/419 |
| 2016/0116737 A1* | 4/2016 | Fujino | G06T 7/00 |
| 2018/0046874 A1* | 2/2018 | Guo | G06K 9/3208 |

* cited by examiner

*Primary Examiner* — Brian T Pendleton
*Assistant Examiner* — Alan H Luong
(74) *Attorney, Agent, or Firm* — Fenwick & West LLP (57) ABSTRACT

An imaging device captures images of a head-mounted display (HMD), or other object, including locators providing a pattern of light. The imaging device compresses captured images of the locators of the HMD by identifying pixels of a captured image having at least a threshold brightness and additional pixels within a threshold distance of the identified pixels. To generate a compressed image, the camera performs run-length encoding of pixels other than the identified pixels and additional pixels. The compressed image is provided by the imaging device to a console or other computing device. In some embodiments, the imaging device also determines whether a segment of adjacent pixels in a captured image is above the threshold brightness and sets the segment of adjacent pixels to a specific value and performs run-length encoding on the segment of adjacent pixels above the threshold brightness.

20 Claims, 3 Drawing Sheets

COMPRESSION OF CAPTURED IMAGES INCLUDING LIGHT CAPTURED FROM LOCATIONS ON A DEVICE OR OBJECT

BACKGROUND

The present disclosure generally relates to head mounted displays presenting content to users, and specifically to capturing information identifying a position of a head mounted display.

Virtual reality (VR), augmented reality (AR), and mixed reality (MR) systems include components for determining position and movement of a headset or other device worn or used by a user. For example, a head mounted display (HMD) includes various locators located in specific positions on the HMD relative to one another and relative to a specific reference point on the HMD. Each locator emits or reflects light that contrasts with an environment in which the HMD operates. An imaging device captures images of the HMD that include one or more of the locators. Based on the positions of locators or groupings of locators in the captured images, a position or orientation of the HMD is determined.

In various embodiments, the imaging device communicates captured images of the HMD including one or more locators to a console. From the positions of locators or groupings of locators in an image received from the imaging device, the console determines the position or the orientation of the HMD. However, transmission of images of the HMD from the imaging device to the console may consume significant bandwidth of a connection between the console and the imaging device. Additionally, transmission of images from the imaging device to the console may be time consuming, which may cause discrepancies between the physical orientation or position of the HMD and a position or an orientation of the HMD determined by the console from the images captured by the imaging device.

SUMMARY

A device, such as a head mounted display (HMD), a controller, or an input device, includes various locators located in specific positions on the device relative to one another and relative to a specific reference point on the device. Each locator emits or reflects light that contrasts with an environment in which the device operates. Additionally, the locators are positioned so different locators or groupings of locators correspond to different positions of the surface of the device, allowing orientation of position of the device to be determined from the locators or groupings of locators. In other embodiments, the imaging device captures images of any suitable device including one or more locators.

An imaging device captures images of the device including one or more locators on the device. To compress an image including one or more observed locators on the device, the imaging device identifies pixels in the image having at least a threshold brightness. Additionally, the imaging device identifies additional pixels that are within a threshold distance of an identified pixel having at least the threshold brightness. For example, the imaging device identifies additional pixels within 5 pixels of an identified pixel having at least the threshold brightness. The imaging device generates a compressed representation of the image by performing run-length encoding on the image. In various embodiments, the run-length encoding includes brightness values for each identified pixel and for each additional pixel, but includes numbers of other consecutive pixels having brightness values less than the threshold brightness associated with a minimum brightness value. The imaging device transmits the compressed representation of the image to the console or to another computing device via a wireless or a wired communication channel. The console subsequently decompresses the compressed representation of the image and determines locations of the locators within the image to determine a position or an orientation of the device.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
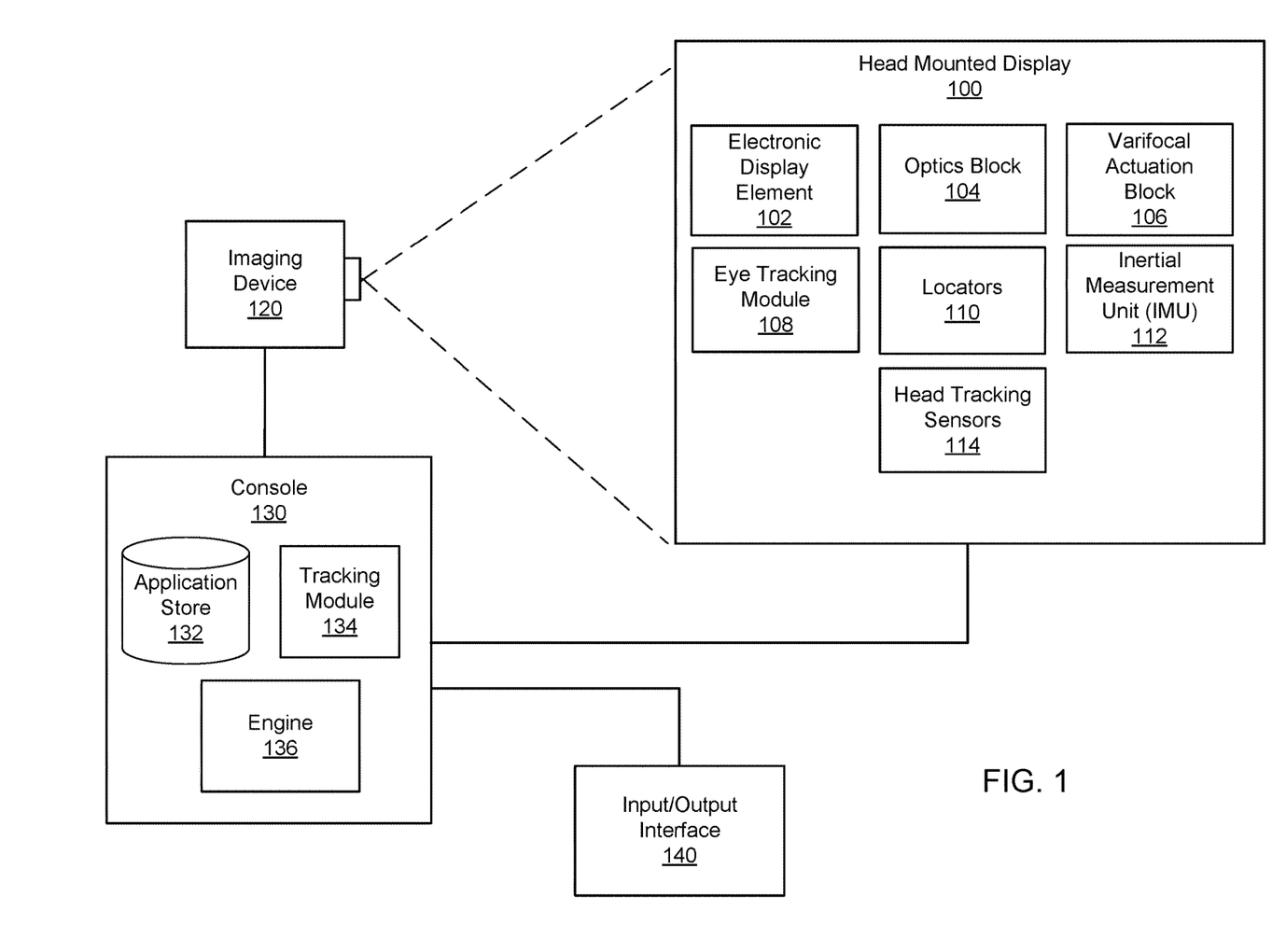
FIG. 1 shows an example system environment including a head mounted display (HMD) presenting content, in accordance with at least one embodiment.

FIG. 1 is a system environment in which a head mounted display (HMD) 100 operates. In this example, the system environment includes the HMD 100, an input/output interface 140, which are each coupled to a console 130. While FIG. 1 shows a single HMD 100, a single imaging device 120, and a single VR input/output interface 140, in other embodiments, any number of these components may be included in the system. For example, there may be multiple HMDs 100 each having an associated input/output interface 140 and being monitored by one or more imaging devices 120, with each HMD 100, input/output interface 140, and imaging device 120 communicating with the console 130. In alternative configurations, different and/or additional components may also be included in the system environment.

The HMD 100 presents content to a user. Example content includes images, video, audio, or some combination thereof. Audio content may be presented via a separate device (e.g., speakers and/or headphones) external to the HMD 100 that receives audio information from the HMD 100, the console 130, or both. The HMD 100 shown in FIG. 1 includes an electronic display element 102, an optics block 104, a varifocal actuation block 106, an eye tracking module 108, one or more locators 110, an internal measurement unit (IMU) 112, and one or more head tracking sensors 114.

The optics block 104 directs light from the electronic display element 102, further described below in conjunction with FIGS. 3 and 4, to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by the optics block 104 allows the electronic display element 102 to be physically smaller, to weigh less, and to consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

In various embodiments, the optics block 104 is designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to the electronic display element 102 for display is pre-distorted, and the optics block 104 corrects the distortion when it receives image light from the electronic display element 102 generated based on the content.

The varifocal actuation block 106 includes a varifocal element causing the optics block 104 to vary the focal length (or optical power) of HMD 100 to keep a user's eyes in a zone of comfort as vergence and accommodation change. In one embodiment, the varifocal actuation block 106 physically changes a distance between the electronic display element 102 and the optical block 104 by moving the electronic display element 102 or the optical block 104 (or both). Alternatively, the varifocal actuation block 106 changes the focal length of the optics block 104 by adjusting one or more properties of one or more lenses. Example properties of a lens adjusted by the varifocal actuation block include: an optical path length, an index of refraction of a lens medium, a shape of a lens, and so forth. For example, the varifocal actuation block 106 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of the HMD 100. Thus, the varifocal actuation block 106 may include actuators or motors that move the electronic display element 102 or the optical block 104 on a track to change the distance between them or may include actuators and other components or mechanisms for changing the properties of one or more lenses included in the optics block 104. The varifocal actuation block 106 may be separate from or integrated into the optics block 104 in various embodiments.

In some embodiments, different states of the optics block 104 correspond to different focal lengths of the HMD 100 or to a combination of the focal length and eye position relative to the optics block 104. In operation, the optics block 104 may move in a range of ~5 mm with a positional accuracy of ~5 µm for a granularity of around 1000 focal lengths, corresponding to 1000 states of the optics block 104. Any number of states could be provided; however, a limited number of states accommodate the sensitivity of the human eye, allowing some embodiments to include fewer focal lengths. For example, a first state corresponds to a focal length of a theoretical infinity meters (0 diopter), a second state corresponds to a focal length of 2.0 meters (0.5 diopter), a third state corresponds to a focal length of 1.0 meters (1 diopter), a fourth state corresponds to a focal length of 0.5 meters (1 diopter), a fifth state corresponds to a focal length of 0.333 meters (3 diopter), and a sixth state corresponds to a focal length of 0.250 meters (4 diopter). The varifocal actuation block 106, thus, sets and changes the state of the optics block 104 to achieve a desired focal length.

The eye tracking module 108 tracks an eye position and eye movement of a user of the HMD 100. A camera or other optical sensor inside the HMD 100 captures image information of a user's eyes, and eye tracking module 108 uses the captured information to determine interpupillary distance, intraocular distance, a three-dimensional (3D) position of each eye relative to the HMD 100 (e.g., for distortion adjustment purposes), including a magnitude of torsion and rotation (i.e., roll, pitch, and yaw) and gaze directions for each eye. In one example, infrared light is emitted within the HMD 100 and reflected from each eye. The reflected light is received or detected by the camera and analyzed to extract eye rotation from changes in the infrared light reflected by each eye. Many methods for tracking the eyes of a user can be used by the eye tracking module 108. Accordingly, the eye tracking module 108 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 108 integrates information from past measurements, measurements identifying a position of a user's head, and 3D information describing a scene presented by the electronic display element 102. Thus, information for the position and orientation of the user's eyes is used to determine the gaze point in a virtual scene presented by the HMD 100 where the user is looking.

Based on information from the eye tracking module 108, the varifocal actuation block 106 determines a vergence depth of a user's gaze based on the gaze point or an estimated intersection of the gaze lines determined by the eye tracking module 108. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the varifocal actuation block 106 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of the optics block 104 may be a function of the vergence or accommodation depth and the 3D position of each eye, so the optics block 104 brings objects in a scene presented by electronic display element 102 into focus for a user viewing the scene. Further, vergence and accommodation information may be combined to focus optics block 104 and to render synthetic depth of field blur.

Locators 110 are objects located in specific positions on the HMD 100 relative to one another and relative to a specific reference point on the HMD 100. A locator 110 may be a light emitting diode (LED), a corner cube reflector, a reflective marker, a type of light source that contrasts with an environment in which the HMD 100 operates, or some combination thereof. Active locators 110 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In various embodiments, locators 110 are located beneath an outer surface of the HMD 100, which is transparent to the wavelengths of light emitted or reflected by locators 110 or is thin enough not to substantially attenuate the wavelengths of light emitted or reflected by locators 110. Further, the outer surface or other portions of the HMD 100 can be opaque in the visible band of wavelengths of light. Thus, the locators 110 may emit light in the IR band while under an outer surface of the HMD 100 that is transparent in the IR band but opaque in the visible band.

The inertial measurement unit (IMU) 112 is an electronic device that generates fast calibration data based on measurement signals received from one or more head tracking sensors 114, which generate one or more measurement signals in response to motion of the HMD 100. Examples of head tracking sensors 114 include accelerometers, gyroscopes, magnetometers, other sensors suitable for detecting motion, correcting error associated with the IMU 112, or some combination thereof. Head tracking sensors 118 may be located external to the IMU 112, internal to the IMU 112, or some combination thereof.

Based on the measurement signals from the head tracking sensors 118, the IMU 112 generates fast calibration data indicating an estimated position of the HMD 100 relative to an initial position of the HMD 100. For example, head tracking sensors 118 include multiple accelerometers to measure translational motion (forward/back, up/down, left/right) and multiple gyroscopes to measure rotational motion (e.g., pitch, yaw, and roll). The IMU 112 can, for example, rapidly sample the measurement signals and calculate the estimated position of the HMD 100 from the sampled data. For example, the IMU 112 integrates measurement signals received from the accelerometers over time to estimate a velocity vector and integrates the velocity vector over time to determine an estimated position of a reference point on the HMD 100. The reference point is a point that may be used to describe the position of the HMD 100. While the reference point may generally be defined as a point in space, in various embodiments, reference point is defined as a point within the HMD 100 (e.g., a center of the IMU 112). Alternatively, the IMU 112 provides the sampled measurement signals to the console 130, which determines the fast calibration data.

The IMU 112 can additionally receive one or more calibration parameters from the console 130. As further discussed below, the one or more calibration parameters are used to maintain tracking of the HMD 100. Based on a received calibration parameter, the IMU 112 may adjust one or more IMU parameters (e.g., sample rate). In some embodiments, certain calibration parameters cause the IMU 112 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 120 generates slow calibration data in accordance with calibration parameters received from the console 130. Slow calibration data includes one or more images showing observed positions of locators 110 that are detectable by the imaging device 120. In various embodiments, the imaging device 120 may include one or more cameras, one or more video cameras, other devices capable of capturing images including one or more locators 110, or some combination thereof. Additionally, the imaging device 120 may include one or more filters (e.g., for increasing signal to noise ratio). The imaging device 120 is configured to detect light emitted or reflected from locators 110 in a field of view of the imaging device 120. In embodiments where locators 110 include passive elements (e.g., a retroreflector), the imaging device 120 may include a light source that illuminates some of or all of the locators 110, which retro-reflect the light towards the light source in imaging device 120. Slow calibration data is communicated from the imaging device 120 to the console 130, and the imaging device 120 receives one or more calibration parameters from the console 130 to adjust one or more imaging parameters (e.g., focal length, focus, frame rate, ISO, sensor temperature, shutter speed, aperture, etc.).

In various embodiments, the imaging device 120 compresses images of observed locators 110 on the HMD 100. As further described below in conjunction with FIGS. 3 and 4, to compress an image including one or more observed locators 110 on the HMD 100, the imaging device 120 identifies pixels in the image having at least a threshold brightness. Additionally, the imaging device 120 identifies additional pixels that are within a threshold distance of an identified pixel having at least the threshold brightness. For example, the imaging device 120 identifies additional pixels within 5 pixels of an identified pixel having at least the threshold brightness. The imaging device 120 generates a compressed representation of the image by performing run-length encoding on the image. In various embodiments, the run-length encoding includes brightness values for each identified pixel and for each additional pixel, but includes numbers of other consecutive pixels having brightness values less than the threshold brightness associated with a minimum brightness value. The imaging device 120 transmits the compressed representation of the image to the console 130 or to another computing device via a wireless or a wired communication channel. The console 130 subsequently decompresses the compressed representation of the image and determines locations of the locators 110 within the image to determine a position or an orientation of the HMD 100.

The input/output interface 140 is a device that allows a user to send action requests to the console 130. An action request is a request to perform a particular action. For example, an action request may be to start or end an application or to perform a particular action within the application. The input/output interface 140 may include one or more input devices. Example input devices include a keyboard, a mouse, a game controller, or any other suitable device for receiving action requests and communicating the received action requests to the console 130. An action request received by the input/output interface 140 is communicated to the console 130, which performs an action corresponding to the action request. In some embodiments, the input/output interface 140 may provide haptic feedback to the user in accordance with instructions received from the console 130. For example, haptic feedback is provided by the input/output interface 140 when an action request is received, or the console 130 communicates instructions to the input/output interface 140 causing the input/output interface 140 to generate haptic feedback when the console 130 performs an action.

The console 130 provides content to the HMD 100 for presentation to the user in accordance with information received from the imaging device 120, the HMD 100, or the input/output interface 140. In the example shown in FIG. 1, the console 130 includes an application store 122, a tracking module 134, and an engine 136. Some embodiments of the console 130 have different or additional modules than those described in conjunction with FIG. 1. Similarly, the functions further described below may be distributed among components of the console 130 in a different manner than is described here.

The application store 132 stores one or more applications for execution by the console 130. An application is a group of instructions, that when executed by a processor, generates content for presentation to the user. Content generated by an application may be in response to inputs received from the user via movement of the HMD 100 or via the input/output interface 140. Examples of applications include gaming applications, conferencing applications, video playback application, or other suitable applications.

The tracking module 134 calibrates the system environment using one or more calibration parameters and may adjust one or more calibration parameters to reduce error in determining position of the HMD 100. For example, the tracking module 134 adjusts the focus of the imaging device 120 to obtain a more accurate position for observed locators 110 on the HMD 100. Moreover, calibration performed by the tracking module 134 also accounts for information received from the IMU 112. Additionally, if tracking of the HMD 100 is lost (e.g., the imaging device 120 loses line of sight of at least a threshold number of the locators 110), the tracking module 134 re-calibrates some or all of the system environment components.

Additionally, the tracking module 134 tracks the movement of the HMD 100 using slow calibration information from the imaging device 120 and determines positions of a reference point on the HMD 100 using observed locators from the slow calibration information and a model of the HMD 100. The tracking module 134 also determines positions of the reference point on the HMD 100 using position information from the fast calibration information from the IMU 112 on the HMD 100. Additionally, the tracking module 134 may use portions of the fast calibration information, the slow calibration information, or some combination thereof, to predict a future location of the HMD 100, which is provided to the engine 136.

The engine 136 executes applications within the system environment and receives position information, acceleration information, velocity information, predicted future positions, or some combination thereof for the HMD 100 from the tracking module 134. Based on the received information, the engine 136 determines content to provide to the HMD 100 for presentation to the user, such as a virtual scene. For example, if the received information indicates that the user has looked to the left, the engine 136 generates content for the HMD 100 that mirrors or tracks the user's movement in a virtual environment. Additionally, the engine 136 performs an action within an application executing on the console 130 in response to an action request received from the input/output interface 140 and provides feedback to the user that the action was performed. The provided feedback may be visual or audible feedback via the HMD 100 or haptic feedback via the input/output interface 140.

Figure 2:
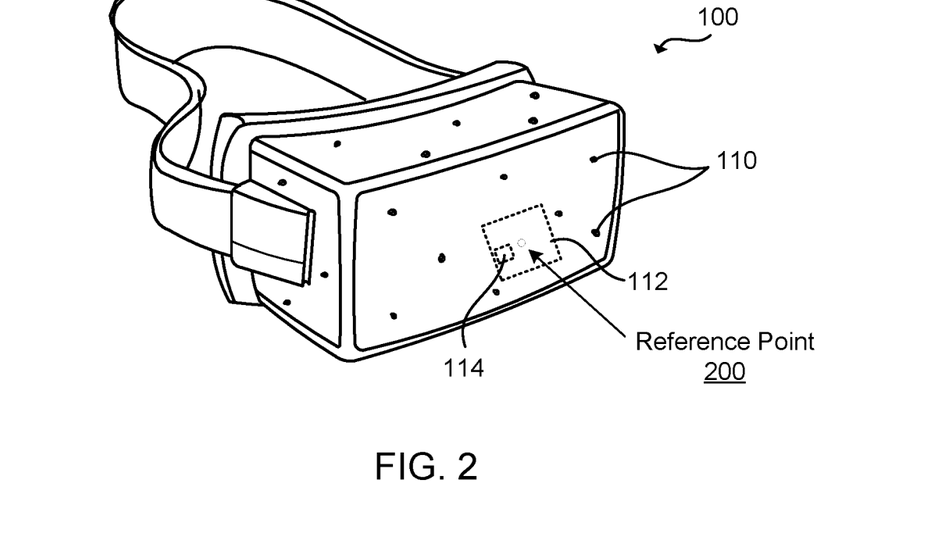
FIG. 2 shows a diagram of a head mounted display (HMD), in accordance with at least one embodiment.

FIG. 2 is a diagram of the head mounted display (HMD) 100, in accordance with at least one embodiment. In this example, the HMD 100 includes a front rigid body and a band that goes around a user's head. The front rigid body includes one or more electronic display elements corresponding to the electronic display element 102, the IMU 112, the head tracking sensors 114, and the locators 110. In this example, the head tracking sensors 114 are located within the IMU 112.

The locators 110 are located in fixed positions on the front rigid body relative to one another and relative to a reference point 200. In this example, the reference point 200 is located at the center of the IMU 112. Each of the locators 110 emits light that is detectable by the imaging device 120. Locators 110, or portions of locators 110, are located on a front side, a top side, a bottom side, a right side, and a left side of the front rigid body, as shown FIG. 2.

Compression of Captured Images Including Locators of a Head Mounted Display

Figure 3:
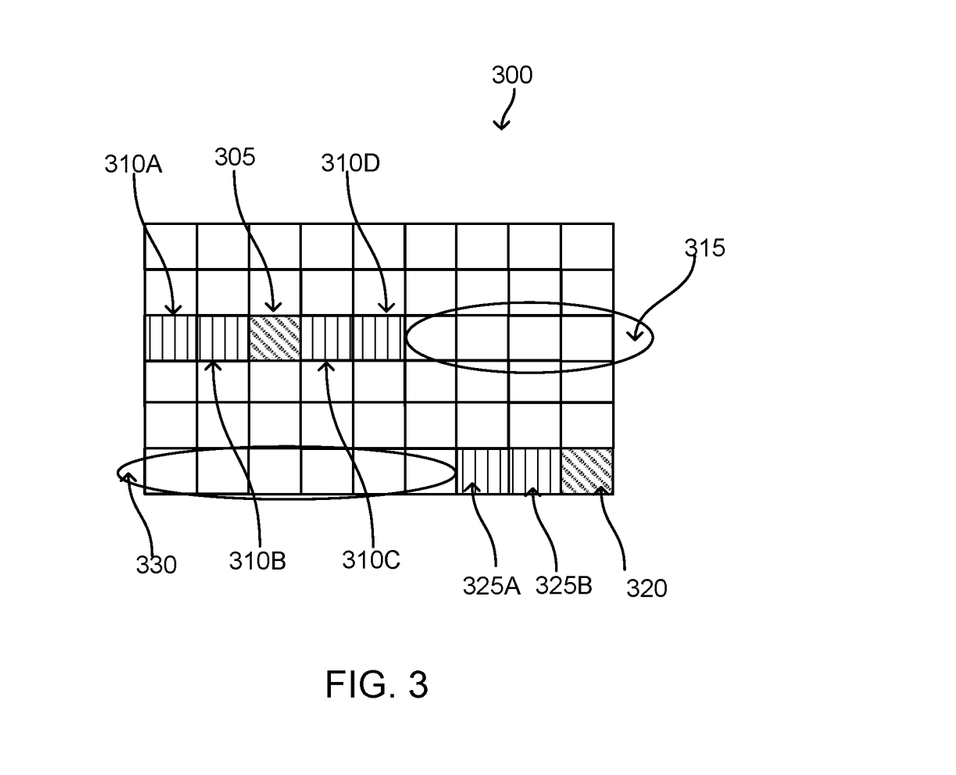
FIG. 3 is an example image of a surface of a head mounted display (HMD) captured by an imaging device, in accordance with at least one embodiment.

FIG. 3 is an example image 300 of a surface of a head mounted display (HMD) 100 captured by an imaging device 120. In the example of FIG. 3, the surface of the HMD 100 includes various locators 110 located in specific positions on the HMD 100 relative to one another and relative to a specific reference point on the HMD 100. Each locator 110 emits or reflects light that contrasts with an environment in which the HMD 100 operates. Additionally, the locators 110 are positioned so different locators 110 or groupings of locators 110 correspond to different positions of the surface of the HMD 100, allowing orientation of position of the HMD 100 to be determined from the locators 110 or groupings of locators 110. In other embodiments, the imaging device 120 captures images of any suitable device including one or more locators 110

The imaging device 120 compresses the image 300 shown in FIG. 3 and transmits a compressed representation of the image 300 to a console 130, reducing bandwidth consumed to communicate the image 300 to the console 130 and decreasing time for transmitting the image 300 to the console 130. To generate the compressed representation of the image 300, the imaging device 120 identifies pixels in the image 300 having at least a threshold brightness, which may be specified by a user, obtained from the console 130, or maintained by the imaging device 120 in various embodiments. In the example of FIG. 3, the imaging device 120 determines that pixel 305 has a brightness value equaling or exceeding the threshold brightness. In the image 300 shown in FIG. 3, pixel 305 corresponds to a position of a locator 110 from which light is captured, causing the brightness value of pixel 305 to equal or exceed the threshold brightness.

After identifying pixel 305 as having a brightness value equaling or exceeding the threshold brightness, the imaging device 120 identifies additional pixels that are within a threshold distance of pixel 305. Hence, the imaging device 120 identifies additional pixels that are within the threshold distance of a pixel having a brightness value equaling or exceeding the threshold brightness. The threshold distance from a pixel having at least the threshold brightness may be specified by the console 130 or may be specified by the imaging device 120. In various embodiments, the threshold distance from a pixel having at least the threshold brightness is configured based on input received by the imaging device 120. For purposes of illustration, FIG. 3 shows an example where the threshold distance from a pixel having at least the threshold brightness is 2 pixels. Accordingly, in the example of FIG. 3, the imaging device 120 identifies pixels 310A, 310B, 310C, and 310D as additional pixels, as each of pixels 310A, 310B, 310C, and 310D are within 2 pixels of pixels 305, which has at least the threshold brightness. For purposes of illustration, FIG. 3 shows an example where the imaging device 120 evaluates each row of the image 300 to identify pixels having at least the threshold brightness and to identify additional pixels in the row that are within the threshold distance of an identified pixel having at least the threshold brightness. In other embodiments, the imaging device 120 evaluates columns of the image 300 to identify pixels having at least the threshold brightness and to identify additional pixels within the column that are within the threshold distance of an identified pixel having at least the threshold brightness.

To generate the compressed representation of the image 300, the imaging device 120 performs run-length encoding on each row of the image 300, generating a sequence of compressed representations of each row of the image 300. When performing run-length encoding on a row of the image 300, the imaging device 120 maintains brightness values for identified pixels and for additional pixels, but associates a specific brightness value with pixels having brightness values less than the threshold brightness and greater than the threshold distance of an identified pixel having a brightness value equaling or exceeding the threshold brightness. Additionally, the imaging device 120 determines a number of consecutive pixels having less than the threshold brightness and greater than the threshold distance from an identified pixel. In the example of FIG. 3, the imaging device 120 identifies a sequence 315 of consecutive pixels greater than two pixels from pixel 305 and having less than the threshold brightness; hence, when generating the compressed representation of the row including pixel 305, the imaging device 120 represents the sequence 315 of pixels as a combination of the number of pixels in the sequence 315 (4 in the example of FIG. 3) in association with the specific brightness value. In some embodiments, the imaging device 120 uses a binary value to represent the specific brightness value, so the imaging device 120 sets the binary value to a particular value to represent the specific brightness value.

In some embodiments, when performing-run length encoding on a row of the image 300, the imaging device 120 associates a specific brightness value with pixels having brightness values greater than an additional threshold brightness and greater than the threshold distance from an identified pixel having a brightness value equaling or exceeding the threshold brightness. The additional threshold brightness differs from the threshold brightness in some embodiments; for example, the additional threshold brightness is greater than the threshold brightness. Alternatively, the additional threshold brightness equals the threshold brightness. When generating a compressed representation of the image 300, the imaging device 120 determines a number of consecutive pixels in a row of the image 300 having brightness values that exceed the additional threshold brightness. In the compressed representation of the image 300, the imaging device 120 represents consecutive pixels in a row of the image 300 having brightness values greater than the additional threshold brightness and greater than the threshold distance from the identified pixel having at least the threshold brightness as a combination of number of consecutive pixels in a row of the image 300 having brightness values greater than the additional threshold brightness and an additional brightness value. In some embodiments, the imaging device 120 uses a binary value to represent the specific brightness value, and the additional brightness value, so the imaging device 120 sets the binary value to a particular value to represent the specific brightness value and to an alternative value to represent the additional brightness value. This allows the imaging device 120 to use a single binary value along with a number to represent consecutive pixels having brightness values below the threshold value or above the additional threshold value.

In some embodiments, the imaging device 120 determines whether a number of consecutive pixels having brightness values exceeding the additional threshold brightness exceeds a threshold number. In response to the number of consecutive pixels having brightness values exceeding the additional threshold brightness exceeds the threshold number, when generating the compressed representation of the image 300, the imaging device 120 represents the consecutive pixels having brightness values exceeding the additional threshold brightness as the number of consecutive pixels having brightness values exceeding the additional threshold brightness in association with an additional brightness value. However, if the number of consecutive pixels having brightness values exceeding the additional threshold brightness does not exceed threshold number, when generating the compressed representation of the image 300, the imaging device 120 represents the consecutive pixels having brightness values exceeding the additional threshold brightness as brightness values for individual pixels having brightness values exceeding the additional threshold brightness.

The compressed representation of a row identifies pixels in the row in a relative order and identifying numbers of consecutive pixels having less than the threshold brightness and greater than the threshold distance from an identified pixel, as well as identifying brightness values for identified pixels and for additional pixels. In the example of FIG. 3, the compressed representation of the row including pixel 305 comprises an ordered sequence of brightness values specifying a brightness value of pixel 310A, a brightness value of pixel 310B, a brightness value of pixel 305, a brightness value of pixel 310C, a brightness value of pixel 310D, and number of pixels in the sequence 315 in combination with the specific brightness value. The ordered sequence of brightness values comprising the compressed representation of the row is ordered based on physical locations of the pixels in the row. In one embodiment, a first brightness value in the ordered sequence corresponds to a left-most pixel in the row, with subsequent brightness values in the sequence representing pixels having positions to the right of the left-most pixel corresponding to a position in the brightness value from the first brightness value. Alternatively, a first brightness value in the ordered sequence corresponds to a right-most pixel in the row, with subsequent brightness values in the sequence representing pixels having positions to the left of the right-most pixel corresponding to a position in the brightness value from the first brightness value.

In the example of FIG. 3, the imaging device 120 also identifies pixel 320 as having a brightness value equaling or exceeding the threshold brightness. As further described above, the imaging device 120 correspondingly identifies pixel 325A and pixel 325B as additional pixels within the threshold distance of pixel 320. The sequence 330 of pixels in the row including pixel 320 have brightness values below the threshold brightness and are greater than the threshold distance from pixel 320, which has at least the threshold brightness. Accordingly, the imaging device 120 generates a compressed representation of the row of the image 300 including the pixel 320 that specifies a number of pixels in the sequence 330 (six in the example of FIG. 3) associated with the specific brightness value, followed by a brightness value of pixel 325A, a brightness value of pixel 325B, and a brightness value of pixel 320. In some embodiments, the imaging device 120 communicates a compressed representation of individual rows of the image 300 to the console 130 after generating the compressed representation of each row, so the console 130 receives a series of compressed representations for different rows of the image 300. In another embodiment, the imaging device 120 generates compressed representations of multiple rows of the image 300 (e.g., all rows of the image 300) and transmits multiple compressed representations corresponding to different rows of the image 300 to the console 130. The imaging device 120 communicates compressed representations of one or more rows of the image to the console 130 via a wireless communication channel in some embodiments. Alternatively, the imaging device 120 communicates compressed representations of one or more rows of the image to the console 130 via a wired connection in other embodiments.

Although FIG. 3 shows an example image of a HMD 100 including locators 110, an image of any suitable device including locators 110 may be captured by an imaging device 120 and compressed as described above in conjunction with FIG. 3. For example, the imaging device similarly captures an image of a surface of a portion of an input/output interface 140 (e.g., a controller, a mouse, another input device), and generates a compressed representation of the image as further described above. In embodiments where the system environment includes multiple imaging devices 120, different imaging devices 120 may generate compressed representations of captured images as described above. For example, an additional imaging device coupled to the HMD 100 captures an image of a device including locators 110 and generates a compressed representation of the captured image, as further described above in conjunction with FIG. 3; the additional imaging device subsequently communicates the compressed representation of the captured image to the console 130 or to another device.

Figure 4:
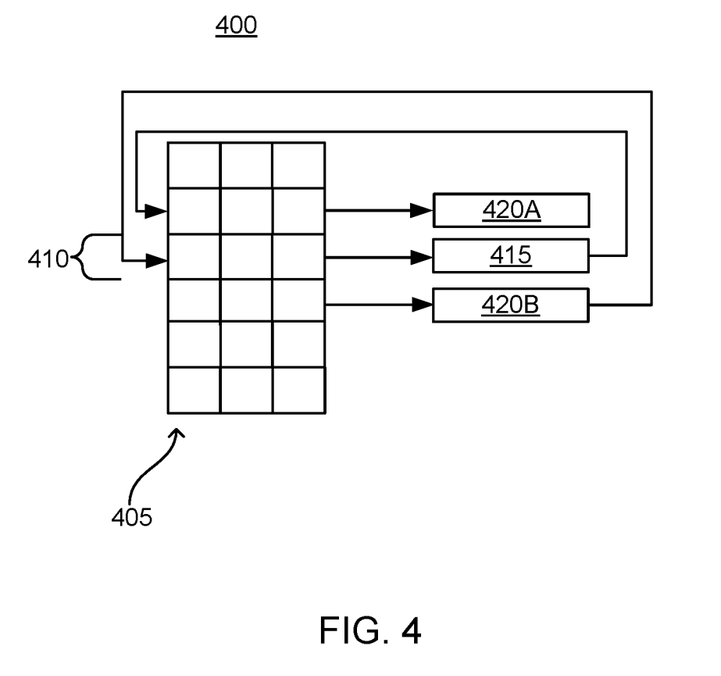
FIG. 4 is an example detector included in an imaging device, in accordance with at least one embodiment.

FIG. 4 shows an example detector 400 included in an imaging device 120. The detector 400 includes a sensor 405 that comprises multiple pixels onto which light from an environment external to the imaging device 120 and within a field of view of the imaging device 120 is incident. For example, the sensor 405 comprises a pixel array. A pixel of the sensor 405 generates a value based on an intensity of light incident on the pixel. For example, a pixel generates a current or a voltage that is directly related to an intensity of light incident on the pixel. The voltage or the current generated by the pixel represents a brightness value of the pixel, so a brightness value of the pixel is directly related to an intensity of light incident on the pixel.

In the example of FIG. 4, the detector 400 includes logic 415 and one or more line buffers 420A, 420B are coupled to rows of the sensor 405. For purposes of illustration, FIG. 4 shows line buffer 420A and line buffer 420A coupled to different rows of the detector 400. However, in various embodiments, the detector 400 includes any suitable number of line buffers 420A, 420B each coupled to different rows of the sensor 405. The logic 410 included in the detector 400 is coupled to a row 410 of the sensor 405 for which the imaging device 120 and obtains a brightness value from each pixel in the row 410 in sequence. The logic 415 compares the brightness value of a pixel of the row 410 to a threshold brightness, as further described above in conjunction with FIG. 3, and outputs an indication of whether the brightness value of a pixel of the row 410 equals or exceeds the threshold brightness. For example, the logic 415 is a field programmable gate array or other suitable component. In some embodiments, the indication is a binary value having a specific value if the brightness value of the pixel equals or exceeds the threshold brightness and an alternative value if the brightness value of the pixel is less than the threshold brightness.

Indications of whether the brightness value of a pixel of the row 410 equals or exceeds the threshold brightness are subsequently stored in a line buffer 420A, 420B along with the brightness value of the pixel of the row 410. In the example shown by FIG. 4, the indications output by the logic 415 are stored in a line buffer 420A coupled to a row of pixels from which the imaging device 120 already compared brightness values to the threshold brightness via the logic 415. For example, the output of the logic 415 is stored in a line buffer 420A coupled to a line that was previously coupled to the logic 415. From the brightness values and indications stored in the line buffer 420A, the imaging device 120 generates a compressed representation of the row 410, as further described above in conjunction with FIG. 3. The imaging device 120 communicates the compressed representation of the row 410 to a console 130 or other computing device coupled to the imaging device 120 in various embodiments and couples the logic 415 to another row to generate a compressed representation of another row.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
a head mounted display (HMD) including a plurality of locators, each locator in a different location of the HMD and emitting light;
an imaging device configured to:
capture an image of the HMD including one or more of the plurality of locators;
compare pixels of the captured image to a threshold brightness, a corresponding brightness value of each pixel based on an intensity of light incident on the pixel;
identify one or more pixels of the captured image, each of the one or more pixels having a corresponding brightness value, each corresponding brightness value equaling or exceeding the threshold brightness;
identify one or more additional pixels that are each within a threshold distance of an identified pixel, each of the one or more additional pixels having a corresponding brightness value, each corresponding brightness value equaling or exceeding the threshold brightness;
generate a compressed representation of the image by performing run-length encoding on each row of the image, the generate comprising: maintaining the corresponding brightness values of the one or more identified pixels for a row, maintaining the corresponding brightness values of the one or more additional pixels for the row, and specifying a number of consecutive pixels having less than the threshold brightness for the row; and
transmit the compressed representation of the image to a console coupled to the imaging device.

2. The system of claim 1, wherein generate the compressed representation of the image by performing run-length encoding on each row of the image further comprises:
determine that the row includes at least a threshold number of consecutive pixels having corresponding brightness values greater than an additional threshold brightness; and
additionally specify a number of consecutive pixels having greater than the additional threshold brightness, and maintain a brightness value associated with the consecutive pixels having greater than the additional threshold brightness.

3. The system of claim 2, wherein generate the compressed representation of the image by performing run-length encoding on each row of the image further comprises:
specify a combination of a particular binary value and the number of consecutive pixels having less than the threshold brightness; and
specify a combination of an alternative binary value that is different than the particular binary value and the number of consecutive pixels having greater than the additional threshold brightness.

4. The system of claim 2, wherein the additional threshold brightness is greater than the threshold brightness.

5. The system of claim 2 wherein generate the compressed representation of the image by performing run-length encoding on each row of the image further comprises:
in response to determining that the number of consecutive pixels having corresponding brightness values greater than the additional threshold brightness exceeds the threshold number, representing the consecutive pixels having greater than the additional threshold brightness as a combination of the number of consecutive pixels having greater than the threshold additional brightness and an additional brightness value.

6. The system of claim 5, wherein-generate the compressed representation of the image by performing run-length encoding on each row of the image further comprises:
in response to determining that the number of consecutive pixels having corresponding brightness values greater than the additional threshold brightness does not exceed the threshold number, representing the consecutive pixels having greater than the additional threshold brightness as individual corresponding brightness values for each corresponding pixel having greater than the threshold additional brightness.

7. The system of claim 1, wherein the compressed representation of the row includes a specific brightness value associated with the number of consecutive pixels having less than the threshold brightness.

8. The system of claim 7, wherein the specific brightness value comprises a particular binary value.

9. The system of claim 1, wherein transmit the compressed representation of the image to the console coupled to the imaging device comprises:
transmit the compressed representation of the image to the console via a wireless communication channel.

10. The system of claim 1, wherein transmit the compressed representation of the image to the console coupled to the imaging device comprises:
transmit compressed representations of rows of the image in series to the console.

11. The system of claim 1, wherein a locator comprised a light emitting diode configured to emit infrared light.

12. A method comprising:
capturing an image of a device including a plurality of locators, each locator in a different location of the device and emitting light;
comparing pixels of the captured image to a threshold brightness, a corresponding brightness value of each pixel based on an intensity of light incident on the pixel;
identifying one or more pixels of the captured image, each of the one or more pixels having a corresponding brightness value, each corresponding brightness value equaling or exceeding the threshold brightness;
identifying one or more additional pixels that are each within a threshold distance of an identified pixel, each of the one or more additional pixels having a corresponding brightness value, each corresponding brightness value equaling or exceeding the threshold brightness;
generating a compressed representation of the image by performing run-length encoding on each row of the image, the generating comprising: maintaining the corresponding brightness values of the one or more identified pixels for a row, maintaining the corresponding brightness values of the one or more additional pixels for the row, and specifying a number of consecutive pixels having less than the threshold brightness for the row; and
transmitting the compressed representation of the image to a console coupled to the imaging device.

13. The method of claim 12, wherein generating the compressed representation of the image by performing run-length encoding on each row of the image further comprises:
determining that the row includes at least a threshold number of consecutive pixels having corresponding brightness values greater than an additional threshold brightness; and additionally specifying a number of consecutive pixels having greater than the additional threshold brightness, and maintaining a brightness value associated with the consecutive pixels having greater than the additional threshold brightness.

14. The method of claim 13, wherein generating the compressed representation of the image by performing run-length encoding on each row of the image further comprises:
specifying a combination of a particular binary value and the number of consecutive pixels having less than the threshold brightness; and
specifying a combination of an alternative binary value that is different than the particular binary value and the number of consecutive pixels having greater than the additional threshold brightness.

15. The method of claim 13, wherein the additional threshold brightness is greater than the threshold brightness.

16. The method of claim 13, wherein generating the compressed representation of the image by performing run-length encoding on each row of the image further comprises:
in response to determining that the number of consecutive pixels having corresponding brightness values greater than the additional threshold brightness exceeds the threshold number, representing the consecutive pixels having greater than the additional threshold brightness as a combination of the number of consecutive pixels having greater than the threshold additional brightness and an additional brightness value.

17. The system of claim 16, wherein generating the compressed representation of the image by performing run-length encoding on each row of the image further comprises:
in response to determining that the number of consecutive pixels having corresponding brightness values greater than the additional threshold brightness does not exceed the threshold number, representing the consecutive pixels having greater than the additional threshold brightness as individual corresponding brightness values for each corresponding pixel having greater than the threshold additional brightness.

18. The method of claim 12, wherein the compressed representation of the row includes a specific brightness value associated with the number of consecutive pixels having less than the threshold brightness.

19. The method of claim 18, wherein the specific brightness value comprises a particular binary value.

20. The method of claim 12, wherein transmitting the compressed representation of the image to the console coupled to the imaging device comprises:
transmitting the compressed representation of the image to the console via a wireless communication channel.

* * * * *